US008175360B2

(12) United States Patent
Razifar et al.

(10) Patent No.: US 8,175,360 B2
(45) Date of Patent: May 8, 2012

(54) METHOD AND SYSTEM OF MULTIVARIATE ANALYSIS ON NORMALIZED VOLUME-WISE DATA IN THE SINOGRAM DOMAIN FOR IMPROVED QUALITY IN POSITRON EMISSION TOMOGRAPHY STUDIES

(75) Inventors: Pasha Razifar, Uppsala (SE); Mats Bergstrom, London (GB); Bengt Langstrom, Uppsala (SE)

(73) Assignee: GE HealthCare Limited, Amersham (GB)

( * ) Notice: Subject to any disclaimer, the term of this patent is extended or adjusted under 35 U.S.C. 154(b) by 937 days.

(21) Appl. No.: 12/065,140

(22) PCT Filed: Aug. 31, 2006

(86) PCT No.: PCT/IB2006/002395
§ 371 (c)(1),
(2), (4) Date: Aug. 14, 2008

(87) PCT Pub. No.: WO2007/026234
PCT Pub. Date: Mar. 8, 2007

(65) Prior Publication Data
US 2008/0310697 A1    Dec. 18, 2008

Related U.S. Application Data

(60) Provisional application No. 60/712,800, filed on Aug. 31, 2005.

(51) Int. Cl.
*G06K 9/00* (2006.01)
(52) U.S. Cl. ........................................ 382/131
(58) Field of Classification Search .................. 382/128, 382/131, 132; 600/407, 425, 427
See application file for complete search history.

(56) References Cited

U.S. PATENT DOCUMENTS

| 5,744,802 | A  | * | 4/1998 | Muehllehner et al. ... 250/363.03 |
| 6,528,793 | B1 | * | 3/2003 | Chen et al. ............... 250/363.03 |
| 7,381,959 | B2 | * | 6/2008 | Manjeshwar et al. ... 250/363.03 |

OTHER PUBLICATIONS

Chen, Z, et.al. "Temporal Processing of Dynamic Positron Emission Tomography via Principal Component Analysis in the Sinogram Domain" IEEE Transactions on Nuclear Science, IEEE Service Center, new York, NY vol. 51, No. 5, Oct. 2004 pp. 2612-2619.
PCT/IB2006/002395 Int'l Search report/written opinion dated Jan. 2007.
Pedersen, et.al. "Principal Component Analysis of Dynamic PET and Gamma Camera Inages: A Methodology to Visualize the Signals in ThePresence of Large Noise" Nuclear Science Symposium AndMedical Imaging Conference, Oct. 31, 1993, p. 1734-1738.
Jahne "Digitial Image Processing" 6th Revised and Extended Edition, Springer, (2005).

* cited by examiner

*Primary Examiner* — Irakli Kiknadze
(74) *Attorney, Agent, or Firm* — Robert F. Chisholm

(57) ABSTRACT

A method and system are provided for improving the quality in positron emission tomography (PET) images. PET input data is masked using raw dynamic PET data (sinograms) as input for primary component analysis (PCA) that generates primary components which in turn are used to create a mask. This mask can be used to allow object pixel data to be extracted from the sinograms into masked sinograms where background pixels outside the reference object are set to zero. A volume-wise approach to PCA uses masked sinograms as input data. Pixel-wise noise pre-normalization may then be performed generating pre-normalized sinograms from the masked PET input data. PCA is then performed on the pre-normalized sinograms resulting in PCA sinograms recreated into PCA-modified sinograms by adding background pixel values of zero. These PCA-modified sinograms may optionally be scaled and may then be reconstructed into dynamic PET images with improved image quality.

19 Claims, 11 Drawing Sheets

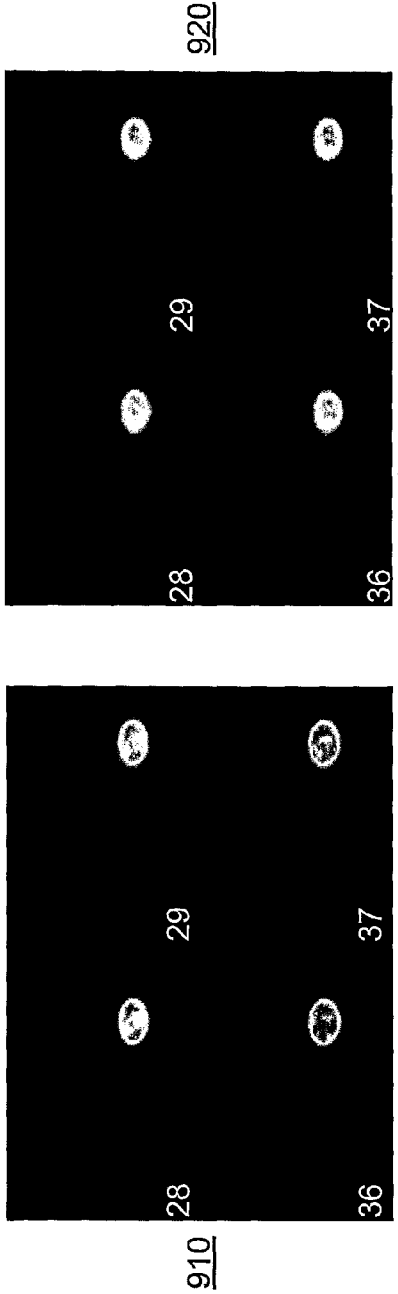
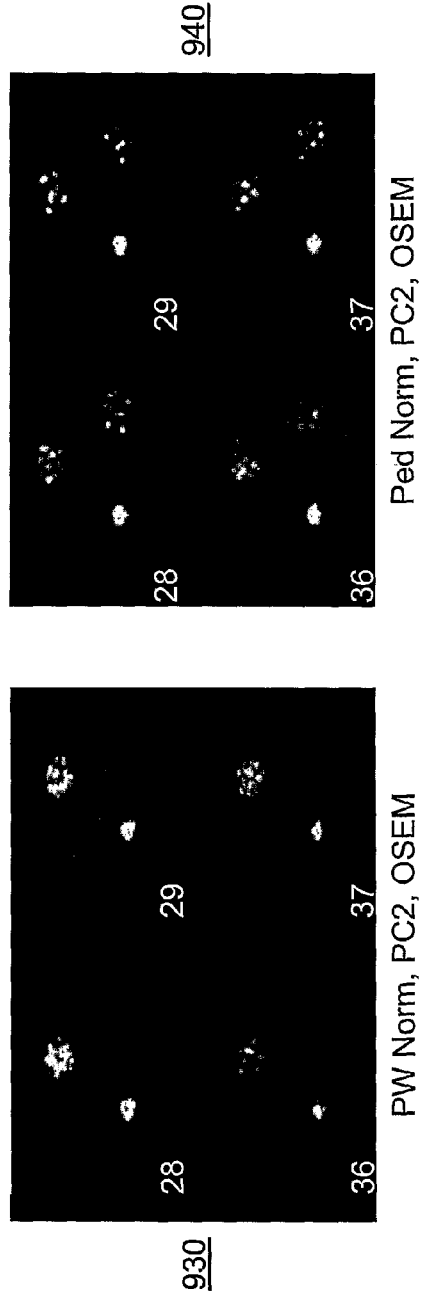
FIG.9A PW Norm, PC1, OSEM
FIG.9B Ped Norm, PC1, OSEM
FIG.9C PW Norm, PC2, OSEM
FIG.9D Ped Norm, PC2, OSEM PW Norm, PC1, 0FBP Ped Norm, PC1, 0FBP PW Norm, PC2, 0FBP Ped Norm, PC2, 0FBP PW Norm, PC3, 0FBP Ped Norm, PC3, 0FBP

METHOD AND SYSTEM OF MULTIVARIATE ANALYSIS ON NORMALIZED VOLUME-WISE DATA IN THE SINOGRAM DOMAIN FOR IMPROVED QUALITY IN POSITRON EMISSION TOMOGRAPHY STUDIES

This application is a filing under 35 U.S.C. 371 of international application No. PCT/IB2006/002395, filed Aug. 31, 2006, which claims priority to application No. 60/712,800 filed Aug. 31, 2005, in the United States the entire disclosure of which is hereby incorporated by reference.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system of multivariate analysis of reference structure normalized images for improved quality in positron emission tomography (PET) studies. One embodiment of the present invention relates to the use of principal component analysis (PCA) as the multivariate analysis tool. This embodiment further relates to the application of PCA on volume-wise raw dynamic PET data which may involve masking the background data and using pre-normalization techniques to reduce or factor out background noise and/or to enhance contrast.

BACKGROUND

Positron Emission Tomography (PET) is an available specialized imaging technique that uses tomography to computer-generate a three-dimensional image or map of a functional process in the body as a result of detecting gamma rays when artificially introduced radionuclides incorporated into biochemical substances decay and release positrons. Analysis of the photons detected from the deterioration of these positrons is used to generate the tomographic images which may be quantified using a color scale to show the diffusion of the biochemical substances in the tissue indicating localization of metabolic and/or physiological processes. For example, radionuclides used in PET may be a short-lived radioactive isotope such as Flourine-18, Oxygen-15, Nitrogen-13, and Carbon-11 (with half-lives ranging from 110 minutes to 20 minutes). The radionuclides may be incorporated into biochemical substances such as compounds normally used by the body that may include, for example, sugars, water, and/or ammonia. The biochemical substances may then be injected or inhaled into the body (e.g., into the blood stream) where the substance (e.g., a sugar) becomes concentrated in the tissue of interest where the radionuclides begin to decay emitting a positron. The positron collides with an electron producing gamma ray photons which can be detected and recorded indicating where the radionuclide was taken up into the body. This set of data may be used to explore and depict anatomical, physiological, and metabolic information in the human body. While alternative scanning methods such as Magnetic Resonance Imaging (MRI), Functional Magnetic Resonance Imaging (fMRI), Computed Tomography (CT), and Single Photon Emission Computed Tomography (SPECT) may be used to isolate anatomic changes in the body, PET may use administrated radiolabeled molecules to detect molecular detail even prior to anatomic change.

A sinogram is the raw PET data that is obtained during a PET study. For example prior to a conventional PET study, a daily scan called a "blank" or "blank scan" (empty gantry) may be performed using one or three rotating rod source(s) of a long-lived positron emitter such as $^{68}$Ge/$^{68}$Ga extended in an empty Field Of View (FOV). The resulting acquired data indicates the characterization of the point-source activity and performance of the detectors. Data generated by the blank scan are used for performing detector normalization or calibration to correct differential detector efficiencies and geometric effects in order to assure the quality of the measurements for the scanner. Furthermore, data acquired performing the blank scan is used for attenuation correction. A patient may then be placed on a translatable bed and is positioned in the center of the FOV without the administration of a radiotracer. A 2D (extended interplane septa) or 3D (retracted interplane septa) data acquisition using rod source(s) of long-lived positron emitter is performed providing data used for performing attenuation correction. This procedure is termed the "transmission scan". Both blank and transmission scans may be performed in windowing mode, implying that only coincidences in the LOR(s) close to the point source(s) are measured. This will decrease registered scattered coincidences. The transmission scan may be followed by a subsequent "emission scan", in which the patient should remain immobile both in-between the transmission and the emission scan and during each scan in order to accurately match the data acquired for both so that accurate attenuation may be performed—an important factor in generating quantitative PET images. All the data generated during these different scan procedures are called sinograms. Simply put, a sinogram is raw PET data in which the gathered detected coincidences by the tomograph (PET camera) are saved and represented as parallel lines (LORs) from different angles. This data may then be corrected before it is reconstructed into the PET images.

PET studies in humans are typically performed in either one of two modes, providing different sets of data: whole body acquisition whereby static data for one body sector at a time is sequentially recorded and dynamic acquisition whereby the same sector is sequentially imaged at different time points or frames. Dynamic PET studies collect and generate data sets in the form of congruent images obtained from the same sector. These sequential images can be regarded as multivariate images from which physiological, biochemical and functional information can be derived by analyzing the distribution and kinetics of administrated radiolabeled molecules. Each one of the images in the sequence displays/contains part of the kinetic information.

Due to limitations in the amount of radioactivity administered to the subject, a usually short half-life of the radionuclide and limited sensitivity of the recording system, dynamic PET data is typically characterized by a rather high level of noise. This together with a high level of non-specific binding to the target and sometimes small differences in target expression between healthy and pathological areas are factors which make the analysis of dynamic PET data difficult independent of the utilized radionuclide or type of experiment. This means that the individual images are not optimal for the analysis and visualization of anatomy and pathology. One of the standard methods used for the reduction of the noise and quantitative estimation in dynamic PET data is to take the sum, average, or mean of the images of the whole sequence or part of the sequence where the specific signal is proportionally larger. However, though sum, average, or mean images may be effective in reducing noise, these approaches result in the dampening of the differences detected between regions with different kinetic behavior.

Another method used for analysis of dynamic PET data is kinetic modeling with the generation of parametric images, aiming to extract areas with specific kinetic properties that can enhance the discrimination between normal and pathologic regions. One of the well established kinetic modeling methods used for parameter estimation is known as the Patlak method (or sometimes Gjedde method). The ratio of target region to reference radioactivity concentration is plotted against a modified time, obtained as the time integral of the reference radioactivity concentration up to the selected time divided by the radioactivity concentration at this time. In cases where the tracer accumulation can be described as irreversible, the Patlak graphical representation of tracer kinetics becomes a straight line with a slope proportional to the accumulation rate. This method can readily be applied to each pixel separately in a dynamic imaging sequence and allows the generation of parametric images representative of the accumulation rate. Alternative methods for the generation of parametric images exist; based on other types of modeling, e.g. Logan plots, compartment modeling, or extraction of components such as in factor analysis or spectral analysis. Other alternatives such as population approaches, where an iterative two stage (ITS) method is utilized, have been proposed and studied and are available.

A notable problem when using kinetic modeling is that the generated parametric images suffer from poor quality while the images are rather noisy. This indicates that kinetic modeling methods such as Reference Patlak, do not consider any Signal-to-Noise-Ratio (SNR) optimization during the measurement of physiological parameters from dynamic data.

Dynamic PET data can also be analyzed utilizing different multivariate, statistical techniques such as Principal Component Analysis (PCA), which is one of the most commonly used multivariate analysis tools. PCA also has several other applications in the medical imaging field such as, for example, in Computed Tomography (CT) and in functional Magnetic Resonance Imaging (fMRI). This technique is employed in order to find variance-covariance structures of the input data in unison to reduce the dimensionality of the data set. The results of the PCA can further be used for different purposes e.g. factor analysis, regression analysis, and used for performing preprocessing of the input/raw data.

The conventional use of PCA indicates a data driven technique which has difficulty in separating the signal from the noise when the magnitude of the noise is relatively high. The presence of variable noise levels in the dynamic PET data dramatically affects the subsequent multivariate analysis unless properly handled otherwise PCA will emphasize noise and not the regions with different kinetics. For this reason, using PCA on dynamic PET data is not an optimal solution.

BRIEF DESCRIPTION OF THE DRAWINGS

FIG. 9 is a comparative selection of principal components (PC images) obtained from applying the MVW-PCA approach to sinogram data and then reconstructing the dynamic PET images using OSEM with applied 4 mm Hanning filter where one set of principal components were obtained applying pixel-wise (PW) noise pre-normalization according to one embodiment of the present invention and the other set of principal components were obtained applying the available Pedersen noise-normalization method for input data.

DETAILED DESCRIPTION

Figure 1:
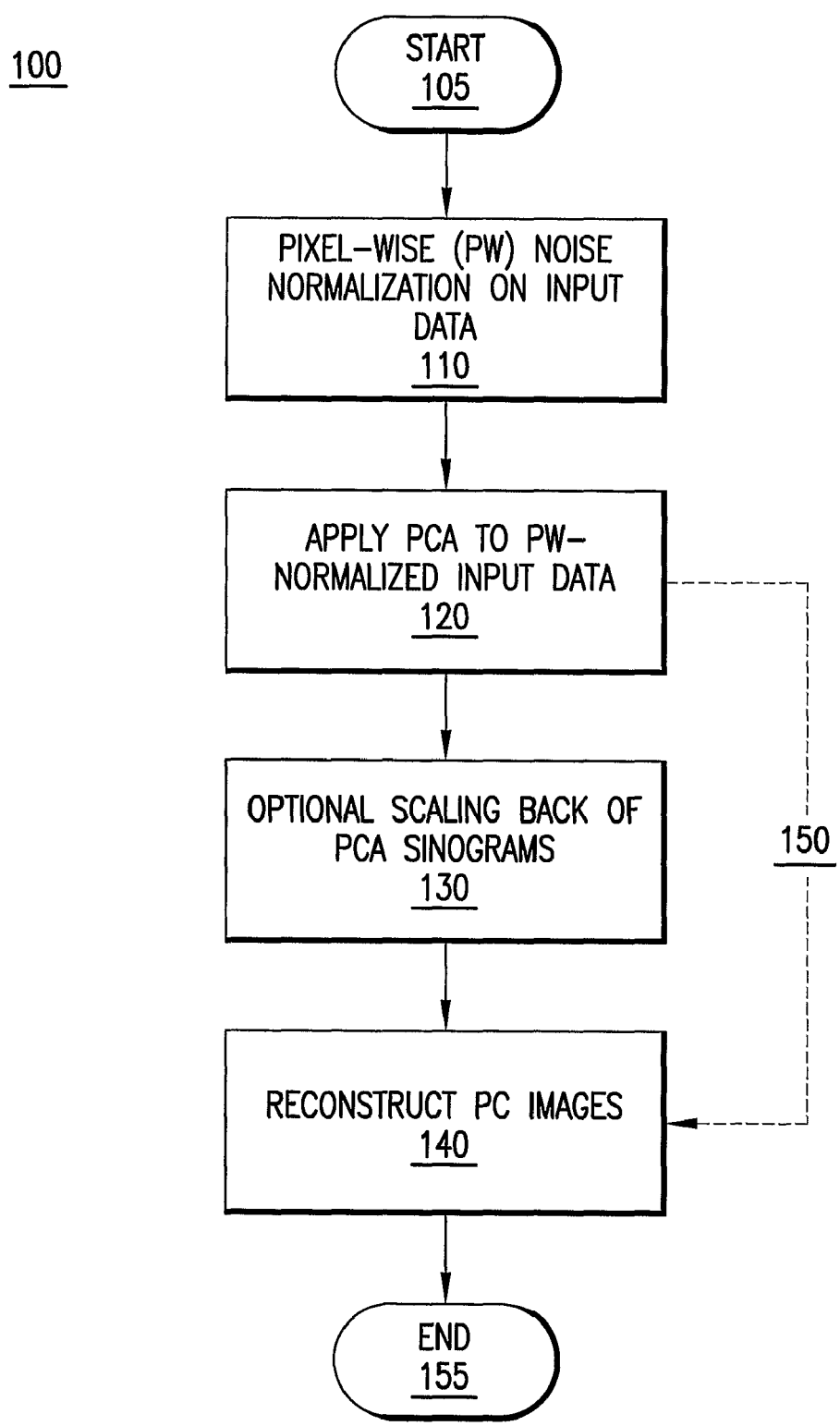
FIG. 1 is a flowchart of the Sinogram-Wise application of PCA (SW-PCA) process for pre-normalized raw PET input data according to one embodiment of the present invention.

In one embodiment of the present invention, these limitations are at least partially overcome by a method and system of masking out the background in the dynamic PET data, performing noise pre-normalization on the masked dynamic PET data, and applying multivariate image analysis (e.g., principal component analysis-PCA) on the masked pre-normalized dynamic PET data in order to improve discrimination between affected and unaffected regions in the brain and improving the quality of the dynamic PET data (and the reconstructed PET image) and diagnosis in the PET studies. A masking operation according to one embodiment of the present invention applies PCA to the dynamic PET data before any pre-normalization in order to generate a first principal component (PC1 image) used to distinguish the object being studied (e.g., the whole brain) from the background in order to mask the background pixels. This masking operation according to one embodiment uses the Otsu method to determine a threshold value used in an automated masking procedure. A pre-normalization method for the masked dynamic PET input data according to one embodiment is a pixel-wise noise normalization where a pixel value is divided by its square root to correct for noise in the dynamic PET data. This normalization of the dynamic PET data is termed pre-normalization herein because it occurs prior to the main processing which in this case is the multivariate analysis (e.g., PCA). In alternative embodiments of the present invention, the masking operation and pixel-wise pre-normalization method may either be performed in a different order or one of the methods may not be performed at all. Multivariate analysis using a tool such as PCA may be applied according to one embodiment of the present invention on the masked pre-normalized dynamic PET data. Additionally, the whole volume or volume-wise application of PCA may be used rather than the sinogram-wise application of PCA (like slice-wise but in the sinogram/data domain instead of the image domain) to further improve the quality of the dynamic PET data by forcing the PCA to analyze the whole volume at one time thereby finding and using the largest variance in the volume-wise structure. This masked volume-wise application of PCA (MVW-PCA) according to this embodiment may significantly improve the quality of the images in a positron emission tomography (PET) study. The resulting masked pre-normalized dynamic PET data may be used to reconstruct the dynamic PET images as discussed herein.

In another embodiment of the present invention, a method and system of noise pre-normalization followed by applying a multivariate analysis tool such as PCA on the pre-normalized dynamic PET data, and optional scaling back of the resulting sinogram data allow a PET image to be reconstructed having improved image quality as a result of reduced noise and improved visualization (contrast) in the reconstructed image. The dynamic PET data (also referred to as raw data or raw PET data) relate to the sinograms generated during the PET scanning process according to one embodiment of the present invention. In particular, the dynamic PET data may relate to the sinograms generated during the emission scan of the PET process as discussed herein.

Additionally, the whole volume application of PCA may be used rather than a sinogram-wise application of PCA (SW-PCA) to further enhance image quality in one embodiment of the present invention (a sinogram exists in the sinogram or data domain and there may be multiple sinograms per frame while a slice is its counterpart in the image domain). In a further embodiment of the present invention, a method and system for the Masked Volume-Wise application of PCA (MVW-PCA) on dynamic PET data (in the sinogram domain) improves the quality of dynamic PET data in a PET study. According to this embodiment, dynamic PET data (also referred to as raw data and sinograms herein) is masked by applying principal component analysis (PCA) on the sinograms in order to determine a mask (including a global threshold value), using for example the Otsu method, where this mask is used to extract object data (i.e., pixel data representing the object) thereby masking out (omitting) the background data. A Pixel-Wise noise-normalization method may then be applied to these masked sinograms generating normalized sinograms. PCA may then be applied to these masked pre-normalized sinograms which may then be recreated to original size by adding background pixels with a value of zero. These recreated sinograms may then be optionally back-scaled. Reconstruction of the dynamic PET image (i.e., the recreated sinograms whether back-scaled or not) may be performed using a reconstruction methodology such as, for example, filtered back projection (FBP) or Ordered Subsets Expectation Maximization (OSEM) and result in a corresponding PET image. This embodiment of the present invention uses MV-W-PCA on dynamic PET data to improve image quality and diagnosis using PET. The method and system may be used on the data for the whole volume of the object (volume-wise approach) and may be referred to as the Masked Volume-Wise application of PCA (MVW-PCA) according to one embodiment of the present invention. MVW-PCA is preferred because it forces PCA to work with the whole data and not part of the data at one time. In an alternative embodiment, the method and system may be used in a sinogram-wise approach to the object (sinogram-by-sinogram or slice-by-slice) and may be referred to as the Masked Sinogram-Wise application of PCA (MSW-PCA—which may also be referred to as the masked slice-wise application of PCA when operating in the image domain instead of the data domain).

Of the different scans performed for the PET study (blank scan, transmission scan, and emission scan) only the emission scan may be performed dynamically (i.e., scanning the same sector at different points of time). According to one embodiment of the present invention, the sinograms representing the dynamic PET data results are from the emission scan and, therefore, the sinograms referred to herein relate to the sinograms resulting from the emission scan. Sinogram data resulting from the blank and transmission scan may be used in correction procedures before applying PET image reconstruction (discussed later herein).

FIG. 1 is a flowchart of the Sinogram-Wise application of PCA (SW-PCA) process for pre-normalized raw PET input data according to one embodiment of the present invention. The SW-PCA process 100 begins 105 by performing noise pre-normalization on the dynamic PET input data (i.e., the sinograms) generated during the tomographic scanning portion of the PET imaging. The sinogram data represents the set of projections generated by the tomograph in the sinogram domain where detector readings are only corrected for random coincidences and normalized for differences in detector efficiency. As a result, statistical properties of the measurements may be more well-defined in the sinogram domain as compared to the spatial (image) domain providing better accuracy in the pre-normalization of the input data. For example, the disadvantages of performing PCA on reconstructed dynamic PET images in the image domain compared to the raw dynamic PET data (i.e., sinograms) in the sinogram domain include effects, such as the propagation of statistical noise across the images caused by applied corrections and errors due to mismatch between the emission and transmission scans induced by for example patient movements, etc., introduced into the reconstructed images. For this reason, the embodiments described herein relate to dynamic PET data in the sinogram domain.

Pixel-Wise (PW) noise pre-normalization (also referred to herein as a "pois" pre-normalization) is the first step 110 in the Sinogram-Wise application of PCA (SW-PCA) 100 and is applied to each sinogram according to this embodiment of the present invention. PW noise pre-normalization 110 involves dividing each pixel value j in the sinogram i (where $X_{ij}$ represents the sinogram containing the pixel) by the square root of the pixel value in order to transform the raw dynamic PET data by correcting for noise in the sinogram. This may be shown in the equation below where $X'_{ij}$ represents the new value of a pixel in a sinogram that is equal to the original raw dynamic PET data value of the pixel $X'_{ij}$ divided by that pixel's square root sqrt($X'_{ij}$). The resulting or transformed sinograms containing the new pixel values are stored in a column vector of a matrix and can serve as the new input data set for the further steps in the SW-PCA process 100. The PW noise pre-normalization equation according to one embodiment of the present invention is shown below.

$$X'_{ij} = \frac{X_{ij}}{\sqrt{|X_{ij}|}}$$

The raw dynamic PET data (sinograms) may reflect a sequence of random events that do not effect the occurrence of other events—that is Poisson statistics may be assumed and used for the acquisition of the raw dynamic PET data—where each of the pixels $_{ij}$ of the sinogram $X_{ij}$ represent the number of detected counts for each detector pair. The equation shown above for PW noise pre-normalization 110 is one embodiment of achieving noise pre-normalization of the pixel data which may be expressed in other ways (e.g., with other equations) in alternative embodiments of the present invention.

The second step 120 in the SW-PCA process 100 is applying PCA (i.e., the multivariate image analysis tool) to the pixel-wise (PW) noise pre-normalized input data where each column vector (e.g., k=1, 2, 3, . . . , 63) of the input matrix (e.g., $C_{kl}$) contains all PW noise pre-normalized pixels from the full sinograms for the different frames (e.g., l=1, 2, 3, . . . , N where N is the number of frames). PCA 120 is a well-established technique based on exploring the variance-covariance or correlation structure between the input data represented in different Principal Components (PCs). PCA is based on the transformation of the original data in order to reduce the dimensionality by calculating transformation vectors (PCs), which define the directions of maximum variance of the data in the multidimensional feature space. Each PC is orthogonal to all the others meaning that the first PC (e.g., PC1) represents the linear combination of the original variables containing the maximum variance, the second PC (e.g., PC2) is the combination containing as much of the remaining variance as possible orthogonal to the previous PC (e.g., PC1) and so on. Though PCA 120 is used in one embodiment of the present invention as the multivariate image analysis tool, in an alternative embodiment other multivariate image analysis tools (such as, for example, independent component analysis—ICA) may be used. The result of this second step 120 is to generate PC1 to PCN sinograms corresponding to the frames 1 to N (also referred to in general as PCA sinograms).

In a third step 130, the PCA sinograms may optionally be scaled back using a method such as, for example, inverse PCA, to ensure quantitative measurement that may be lost during the multivariate analysis step 120 where applying PCA may lose absolute definitions. This back-scaling 130 of the PCA sinograms PC1 to PCN may result in corresponding scaled PCA sinograms PC'1 to PC'N. The sinograms, whether just PCA-analyzed or in addition optionally scaled back (e.g., PC1-PCN or PC'1 to PC'N), may then be reconstructed 140 for further exploration in a fourth step 140 of the SW-PCA process 100 before the process ends 155. The dynamic PET data may be reconstructed 140 analytically by using, for example, a Filtered Back Projection (FBP) method or iteratively by using an Ordered Subsets Expectation Maximization (OSEM) method. Regardless of the reconstruction methodology used, the resulting dynamic PET images may contain effects and/or errors due to the algorithms and corrections used (e.g., FBP or OSEM) which may in turn have an impact on the quality of the reconstructed dynamic PET images. The pre-normalization step 110 and PCA step 120 in the SW-PCA process 100 in the sinogram domain may reduce these effects and/or errors resulting in an enhanced PET image quality.

Figure 2:
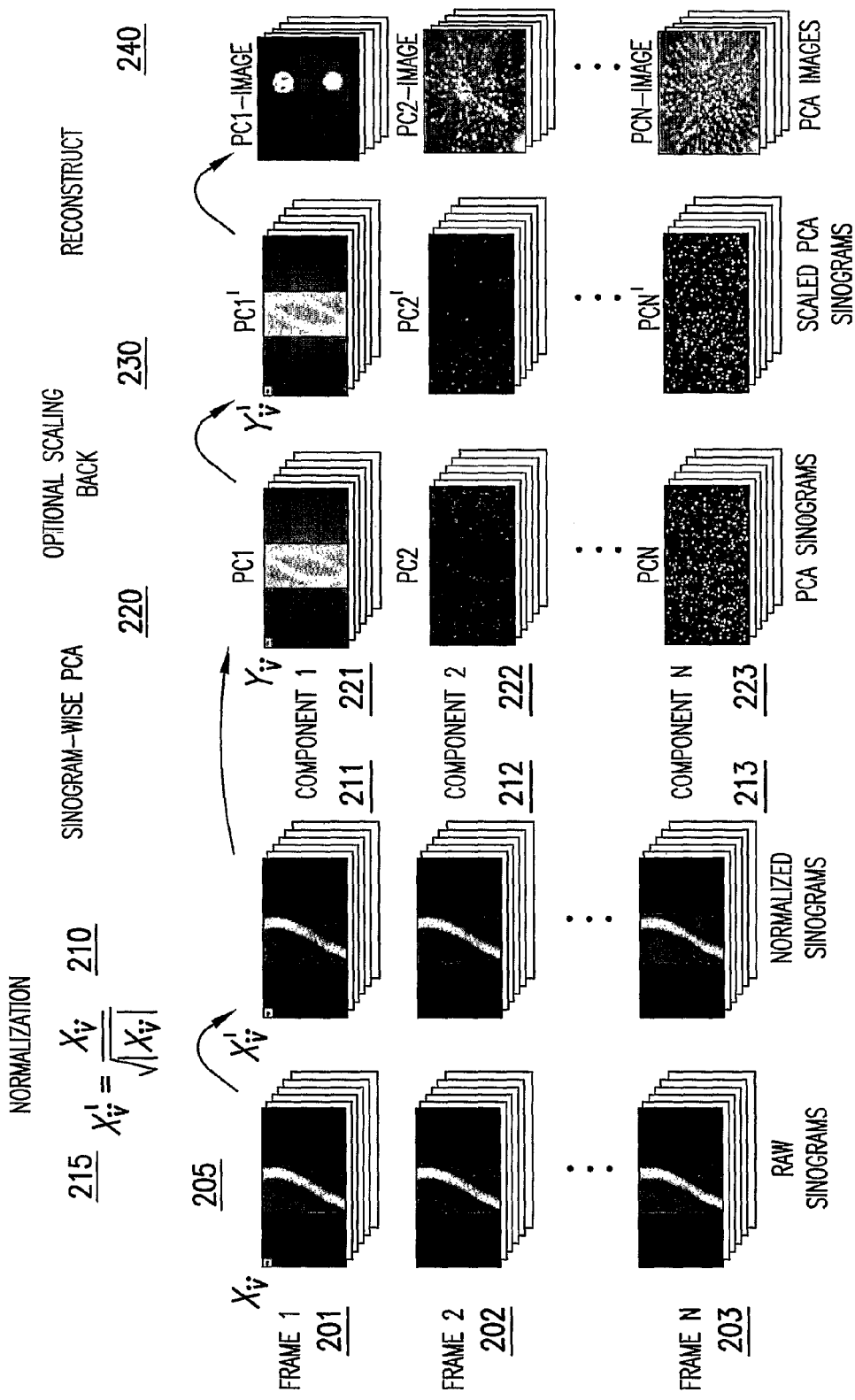
FIG. 2 is an illustration of the Sinogram-Wise application of PCA (SW-PCA) according to one embodiment of the present invention.

FIG. 2 is an illustration of the Sinogram-Wise application of PCA (SW-PCA) according to one embodiment of the present invention. In this illustration, a number of frames 201-203 are shown each representing a reading at a different point in time for the same anatomical or biological region. Any number of frames may be generated in a PET study as represented in FIG. 2 by a first frame 201, a second frame 202, up to N frames 203. For each frame, a number of sinograms may exist because each sinogram in the sinogram domain corresponds to a single slice in the image domain. For example, results obtained from a human PET camera HR+ include 63 slices of size 128×128 per frame in the image domain (totaling 128×128×63) and 63 sinograms of size 288×144 in the sinogram domain (totaling 288×144×63). In FIG. 2, six sinograms 205 are indicated for the first frame 201 for the purposes of illustrating that a number of sinograms may exist for each frame rather than to indicate six sinograms in particular. These sinograms are sets of raw dynamic PET data where no noise pre-normalization has been performed on them yet according to SW-PCA as outlined in FIG. 1. The first step in SW-PCA 110 is PW noise pre-normalization as discussed above. The PW noise pre-normalization 210 is indicated in FIG. 2 as the transformation of the raw dynamic PET data (sinograms) for each frame 201-203 into pre-normalized dynamic PET data (sinograms) 211-213 using the equation 215 as discussed above. The resulting PW noise pre-normalized sinograms for each frame 211-213 are then further transformed 220 by applying PCA to the sinograms to generate a single PCA-modified sinogram for each of the frames (e.g., PC1 221 corresponding to frame 1 201, PC2 222 corresponding to frame 2 202, on to PCN 223 corresponding to frame N 203). These PCA sinograms may then optionally be scaled back 230 to the raw dynamic PET data matrix size where each PCA sinogram (e.g., PC1 to PCN) is transformed into a scaled PCA sinogram (e.g., PC'1 to PC'N). Either the optionally scaled PCA sinograms (e.g., PC'1 to PC'N) or the PCA sinograms (e.g., PC1 to PCN) may then be reconstructed 240 into corresponding dynamic PET images (i.e., the reconstructed dynamic PET images).

In a further enhancement to SW-PCA discussed above, the data in the sinograms may be masked to reduce the background noise in the sinograms and in the images according to another embodiment of the present invention. According to this masking operation, each of the sinograms may be normalized to make the relative background noise similar across the sinograms by estimating the magnitude of the noise in each. For example in one embodiment, the noise magnitude may be determined within a sub-region of the sinogram having a uniform radioactivity distribution such as, for example, outside the region of interest or object of interest. In an alternative embodiment, the noise magnitude may be estimated by the radioactivity concentration within the sinogram and/or by reading the total number of photon counts recorded for the frame which may be found in the file header information. The masking operation may be conducted as part of the Masked Volume-Wise application of PCA (MVW-PCA) discussed below.

Figure 3:
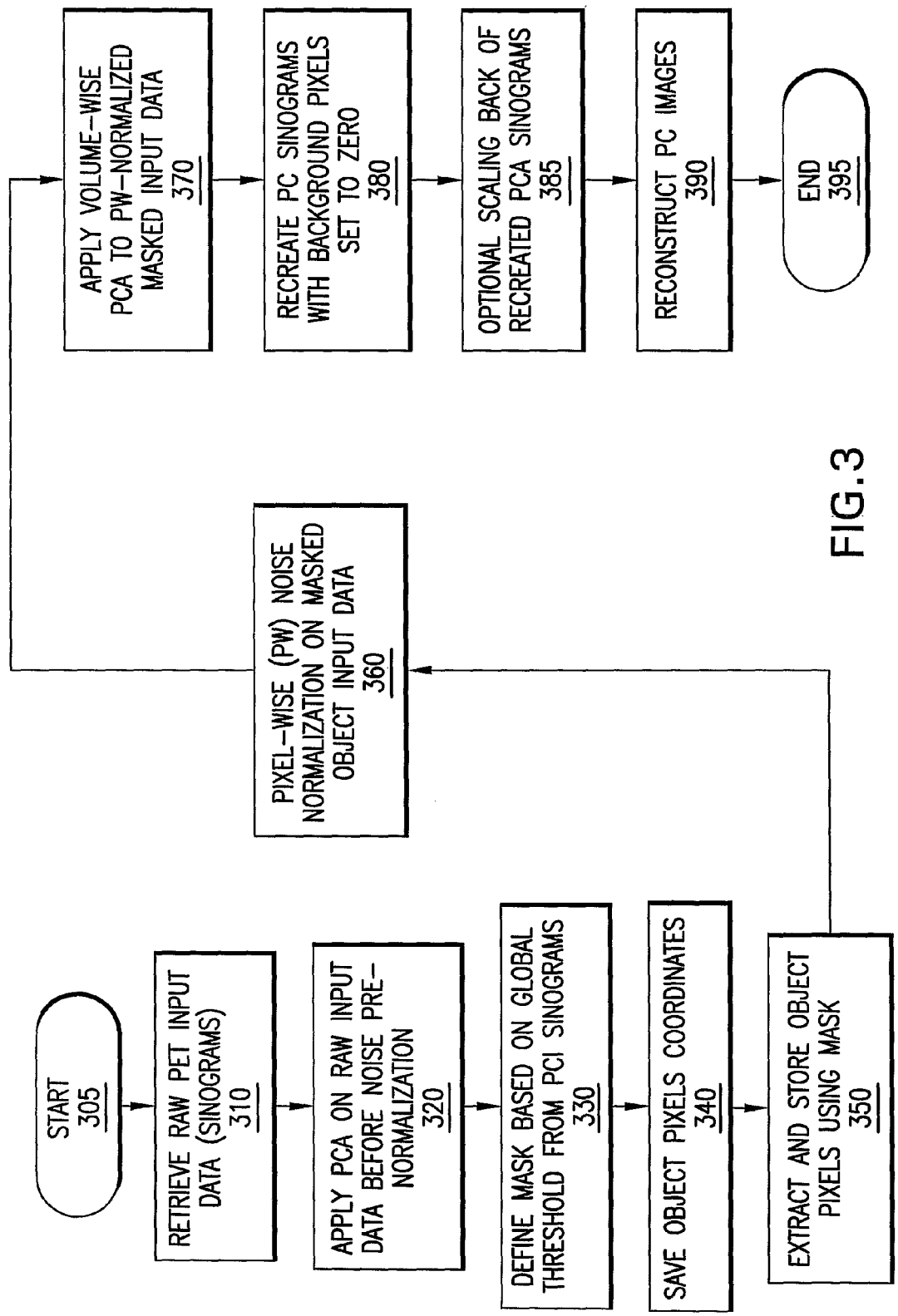
FIG. 3 is a flowchart illustrating the Masked Volume-Wise application of PCA (MVW-PCA) according to one embodiment of the present invention.

The Masked Volume-Wise application of PCA (MVW-PCA) extends SW-PCA (discussed above) according to one embodiment of the present invention. MVW-PCA adds a step to the process where information outside the object studied is masked out in the sinogram in order to improve the application of PCA. FIG. 3 is a flowchart illustrating the Masked Volume-Wise application of PCA (MVW-PCA) according to one embodiment of the present invention. The process 300 begins 305 with a first step 310 in MVW-PCA where raw PET input data 310 is used similar to SW-PCA 100. As in SW-PCA, sinograms 310 are taken for each frame of the PET study according to this embodiment. PCA is then applied 320 on these sinograms (raw dynamic PET data) 310 resulting in PCA sinograms in a manner similar to step 120 described in FIG. 1 above but where the PCA is performed on non-pre-normalized PET input data. Unlike SW-PCA described in FIGS. 1 and 2 above, PW noise-normalization is not used prior to the PCA at this point in MVW-PCA according to this embodiment of the present invention though it may be used in other alternative embodiments. The number of frames 1 to N may result in N PC channels according to this embodiment. The masking operation occurs in the third step 330 where the PC1 sinograms resulting from the PCA on the non-pre-normalized PET input data are separately masked, using for example an iterative threshold obtained using the available Otsu method (though the Otsu method is available it is not generally used with dynamic PET data), in order to determine a global (i.e., common across all the frames for each sinogram) threshold value. In this embodiment, the masking is performed sinogram-wise where a global threshold value is determined for all frames for each sinogram. The result of the masking operation is that each of the pixels is given a value of either one for an object pixel (i.e., a pixel representing the object studied) and zero for a background pixel based on this masking determination according this embodiment of the present invention. Coordinates for the object pixels are then saved 340 and the corresponding object pixels (that represent the object volume) from the non-pre-normalized (original) sinograms are extracted sinogram-by-sinogram and stored 350 in a column vector of a matrix similar to the input matrix (e.g., $C_{kl}$) discussed in SW-PCA above. This new input matrix containing object data then serves as a new set of masked input data for MVW-PCA. The masking embodiment described above is only one example of masking of the sinogram data and in other embodiments of the present invention, other masking methodologies may be used to prepare this new set of masked input data for MVW-PCA.

In a similar manner as described earlier, Pixel-Wise (PW) noise pre-normalization 360 may then performed on this object pixel data found in the new set of masked input data (the resulting new input matrix). As previously described, the same equation shown above for PW noise pre-normalization may also be used according to this embodiment of the present invention. Volume-Wise PCA 370 may then be applied to the PW pre-normalized set of masked input data in a next step 370 in MVW-PCA. The result of the PCA step 370 on the PW pre-normalized masked input data is to generate PC1 to PCN masked PCA sinograms or principal components corresponding to the frames 1 to N. After the masked PCA sinograms are generated, PC sinograms of the original size may be recreated 380 in a further step by placing the pixels from the PC1 to PCN masked sinograms to corresponding coordinates for PC'1 to PC'N in the corresponding frame, where the pixels are stored in a matrix for the frame where the background pixels have been set to zero as a result of the masking operation. The resulting PCA sinograms 380 may optionally be scaled back 385 using a method such as, for example, inverse PCA, to ensure quantitative measurement that may be lost as a result of PCA losing absolute definitions. The scaling back 385 of the PCA sinograms PC'1 to PC'N may result in corresponding scaled masked PCA sinograms PC"1 to PC"N. These sinograms (e.g., PC'1-PC'N or PC"1 to PC"N depending on whether scaling back is performed) may then be reconstructed 390 into the dynamic PET images analytically by using, for example, a Filtered Back Projection (FBP) method or iteratively by using an Ordered Subsets Expectation Maximization (OSEM) method. The end 395 results of MVW-PCA are dynamic PET images that have been noise pre-normalized with the background data masked resulting in enhanced and more readable image quality (e.g., greater visualization of the kinetic behavior of the tracer in the image accompanied by reduced noise).

Figure 4:
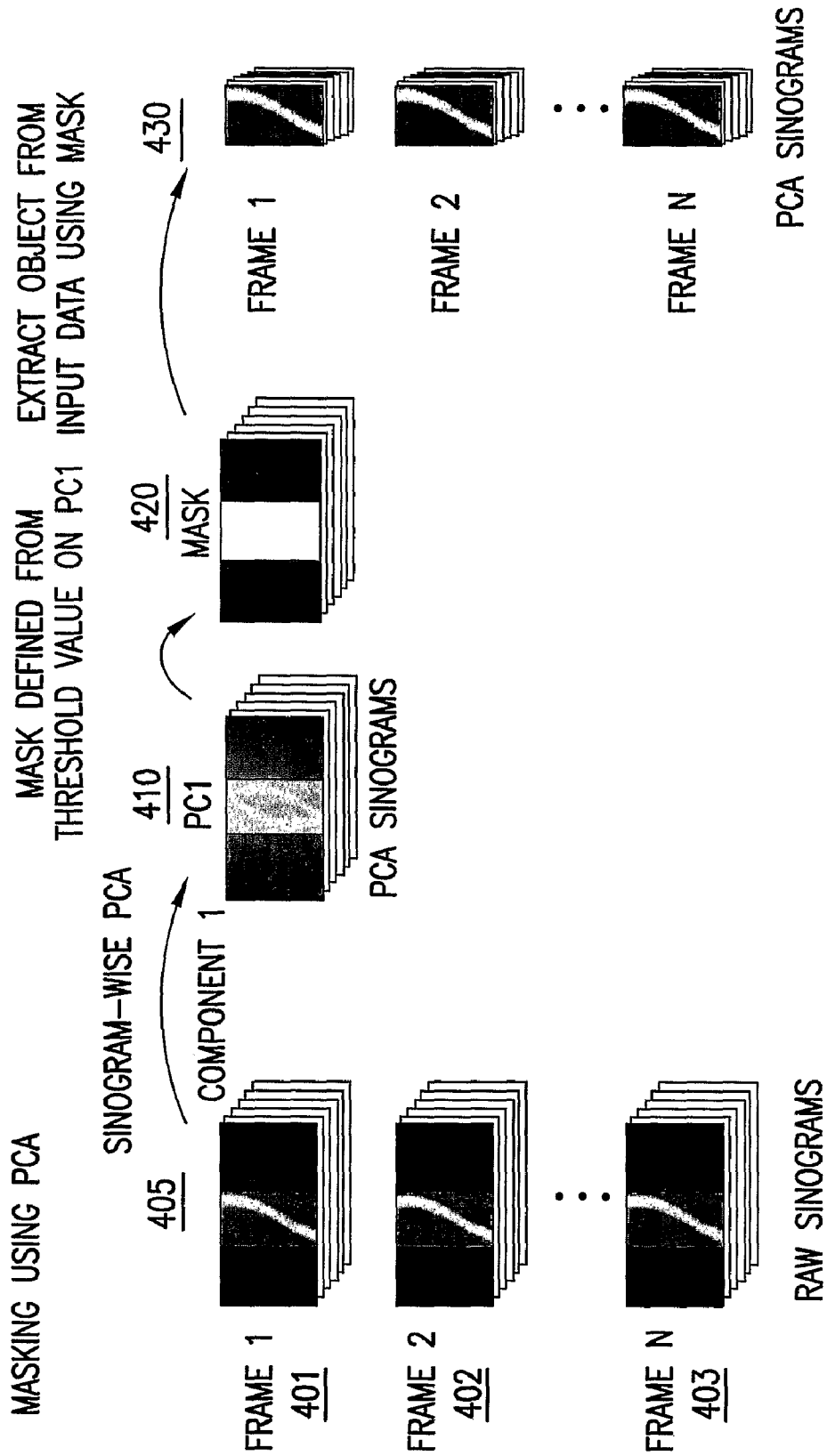
FIG. 4 is an illustration of the masking operation used as part of the Masked Volume-Wise application of PCA (MVW-PCA) according to one embodiment of the present invention.

FIG. 4 is an illustration of the masking operation used as part of the Masked Volume-Wise application of PCA (MVW-PCA) according to one embodiment of the present invention. In this illustration, a number of frames 401-403 are shown each representing a reading at a different point in time for the same anatomical or biological area (for example, the cerebellum). Any number of frames may be generated in the PET study as represented in FIG. 4 with a first frame 401, a second frame 402, and continuing to N frames 403 with each frame containing at least one sinogram. PCA is performed using this raw dynamic PET data (sinograms) 405 (they are not pre-normalized first as discussed in SW-PCA) with the PCA step resulting in PCA sinograms 410 with N number of PC channels for the resulting first principal component (PC1) sinograms. The first primary component (PC1) sinograms are then used to determine a global threshold value 420 to be used as a mask for the masking operation as discussed above. The global threshold value 420 is then used to define a mask 420. The mask 420 is then used to extract the object pixels from the sinograms for each frame in order to generate 430 a masked set of sinograms (dynamic PET data) that can then serve as a new set of masked input data for the volume-wise application of PCA—instead of the original sinogram data (the raw dynamic PET data)—as part of the MVW approach according to this embodiment of the present invention.

Figure 5:
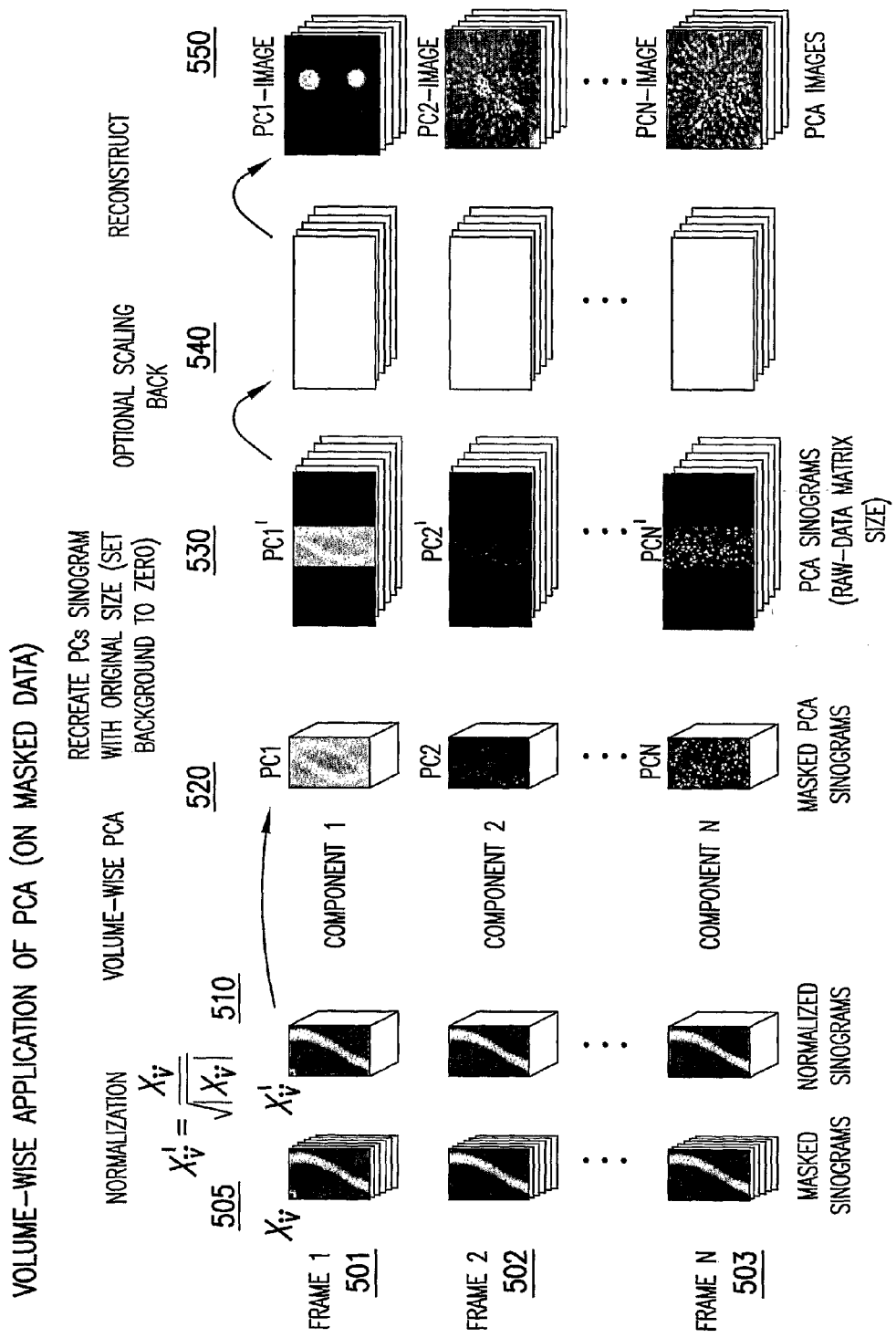
FIG. 5 is an illustration of the volume-wise portion of the application of PCA on masked input data as part of the Masked Volume-Wise application of PCA (MVW-PCA) to dynamic PET data according to one embodiment of the present invention

FIG. 5 is an illustration of the volume-wise portion of the application of PCA on masked input data as part of the Masked Volume-Wise application of PCA (MVW-PCA) to dynamic PET data according to one embodiment of the present invention. The masked input data are the masked PCA sinograms 505 as discussed above that result from the masking operation illustrated in FIG. 4 according to this embodiment. In this illustration, a number of frames 501-503 are shown each representing a reading at a different point in time for the same anatomical or biological area with each frame containing a number (at least one) of masked sinograms (the new set of masked input data). The masked sinograms 505 used as the input data for the MVW-PCA process shown in FIG. 5 are derived from the original raw PET input data and are masked according to the masking operation illustrated in FIG. 4 and discussed above. PW noise pre-normalization 510 is performed on the masked sinogram input data 505 in a similar manner as described earlier for SW-PCA. PCA 520 is then applied on these PW noise pre-normalized masked sinograms 510 transforming them and resulting in corresponding PCA-modified sinograms 520 for each frame. These PCA-modified sinograms 520 may then be recreated into full-size PCA sinograms 530 by retrieving the object pixels from the PCA-modified sinograms and by further including coordinates for the object pixels in a full-size matrix with the background pixel values set to zero. For example, PC1 to PCN of size 288×144×63 each are generated by placing back the pixels from PC1 to PCN to the corresponding coordinates in N zero matrix of the size 288×144×63 in the corresponding frame. This implies that the background pixels of the generated images obtained value zero. These recreated PCA sinograms may then optionally be scaled back 540 as discussed earlier. The recreated PCA sinograms 530, or the back-scaled sinograms 540 if the optional scaling step is performed, may then be reconstructed 550 into corresponding dynamic PET images.

The PCA (multivariate image analysis) step can be described in general as follows. The masked input data used in the masked volume-wise application of PCA (MVW-PCA) may be represented in a matrix X' composed of column vectors $X_i$ that contain the masked object pixel data (e.g., the brain data) for the different frames 1 to i. This matrix may be represented as follows:

$$X'=[X_1,X_2,X_3,\ldots,X_p]$$

where the matrix X' has an associated variance-covariance matrix S with eigenvalues $\lambda=[\lambda_1,\lambda_2,\lambda_3,\ldots,\lambda_p]$ and corresponding eigenvectors $e=[e_1,e_2,e_3,\ldots,e_p]$ where $\lambda_1 \geq \lambda_2 \geq \lambda_3 \geq \ldots \lambda_p \geq 0$ and p corresponds to the number of the input column in the matrix X'. The $q^{th}$ principal component (PCq) may then be generated using the following equation where q=p:

$$Y_q = e'X = e_{q1}X_1 + e_{q2}X_2 + e_{q3} \times X_3 + \ldots + e_{qp}X_p$$

PCA using this equation requires uncorrelated components meaning that the condition $Cov(Y_q,Y_i)=0$ where $i \neq q$ is necessary. In addition, each PC is orthogonal to all other PCs meaning that the first PC (e.g., PC1) represents the linear combination of the original variables or the masked input data which contain (i.e., explains) the greatest amount of variance (maximum variance). The second PC (e.g., PC2) represents the combination of variables containing as much of the remaining variance as possible (i.e., defining the next largest amount of variance) orthogonal to the first PC (i.e., independent of the first principal component) and so on for the following PCs. Each PC explains the magnitude of variance in decreasing order. Performing PCA on the whole brain rather by sinogram allows the largest variance on all the structures of the reference object (e.g., the brain) to be determined for the first PC. This description of PCA is for one embodiment of the present invention and is included as a representative example of PCA. In other embodiments of the present invention, PCA may be performed differently and/or by using different equations other than those described herein.

Figure 6:
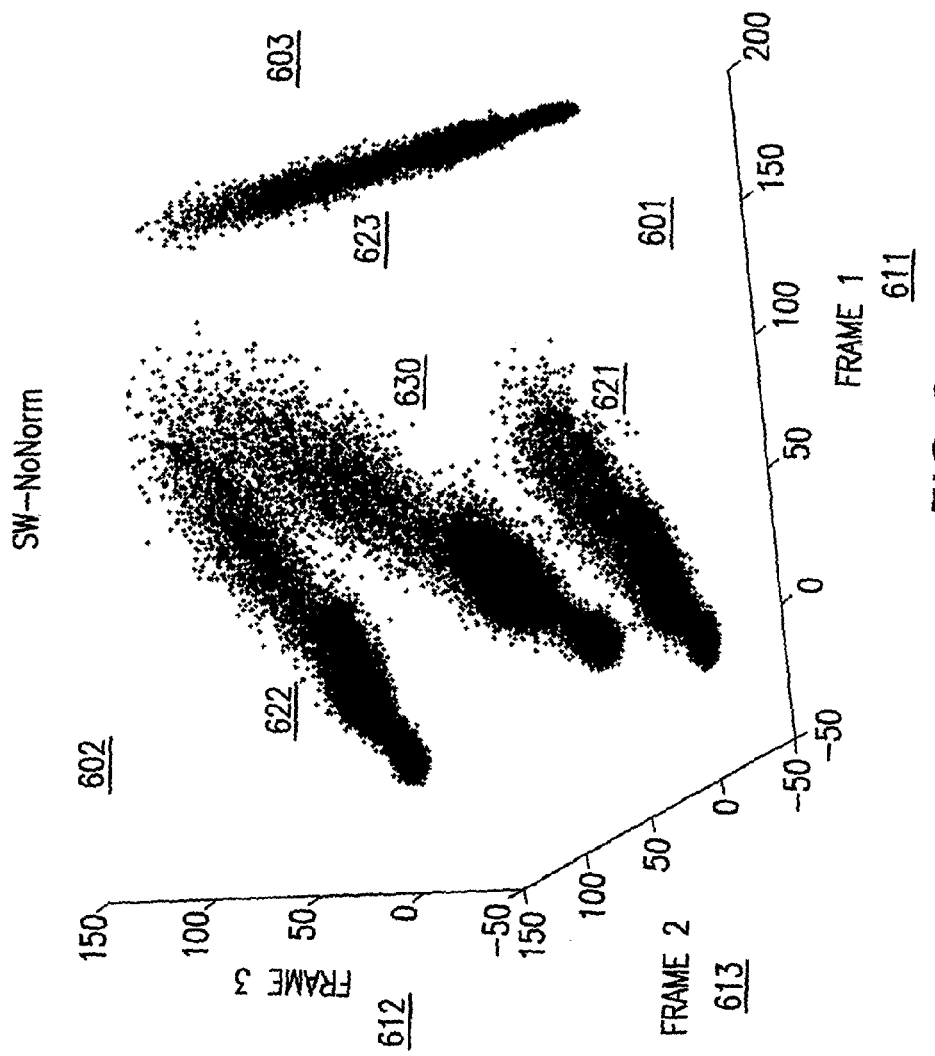
FIG. 6 is a graph illustrating dynamic PET data in the sinogram domain projected across three orthogonal planes where the sinogram data is not masked and not pre-normalized according to one embodiment of the present invention.
Figure 7:
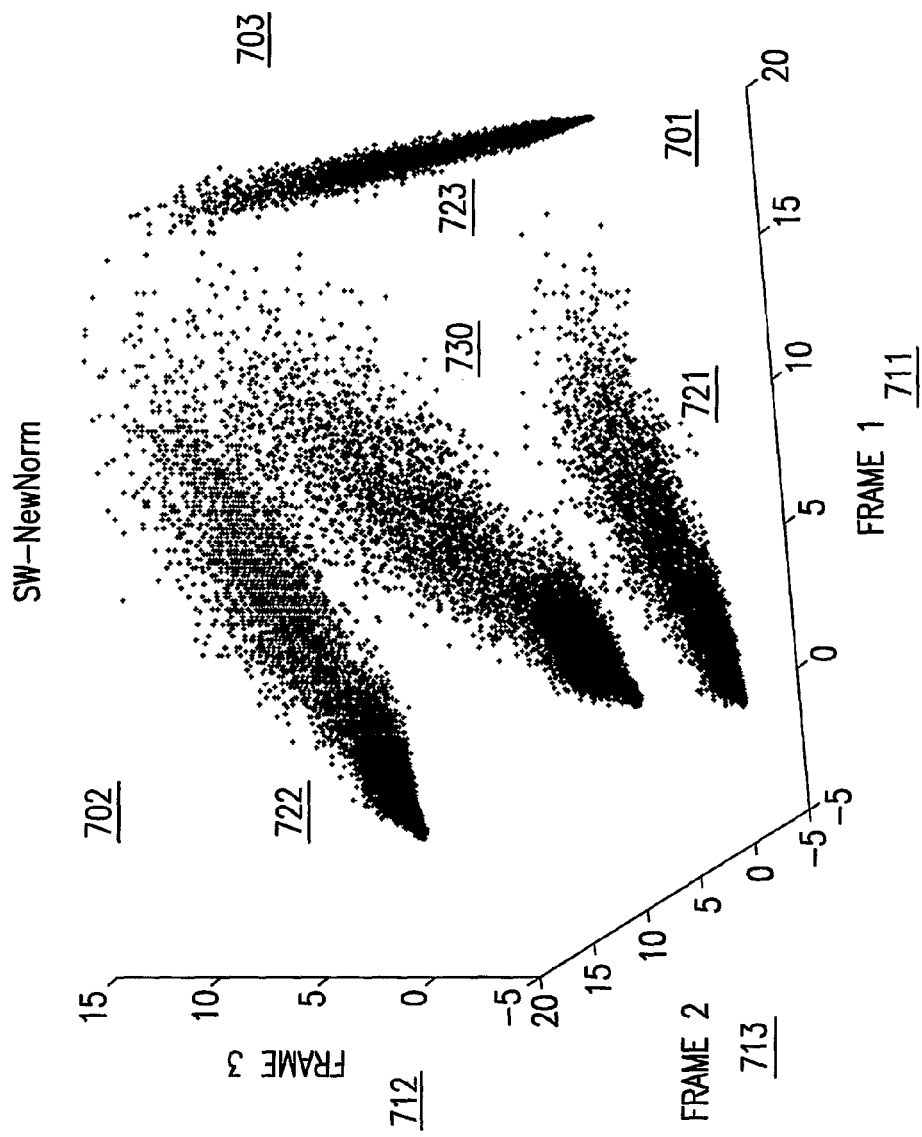
FIG. 7 is a graph illustrating dynamic PET data in the sinogram domain projected across three orthogonal planes where the sinogram data is masked and pixel-wise noise pre-normalized according to one embodiment of the present invention.
Figure 8:
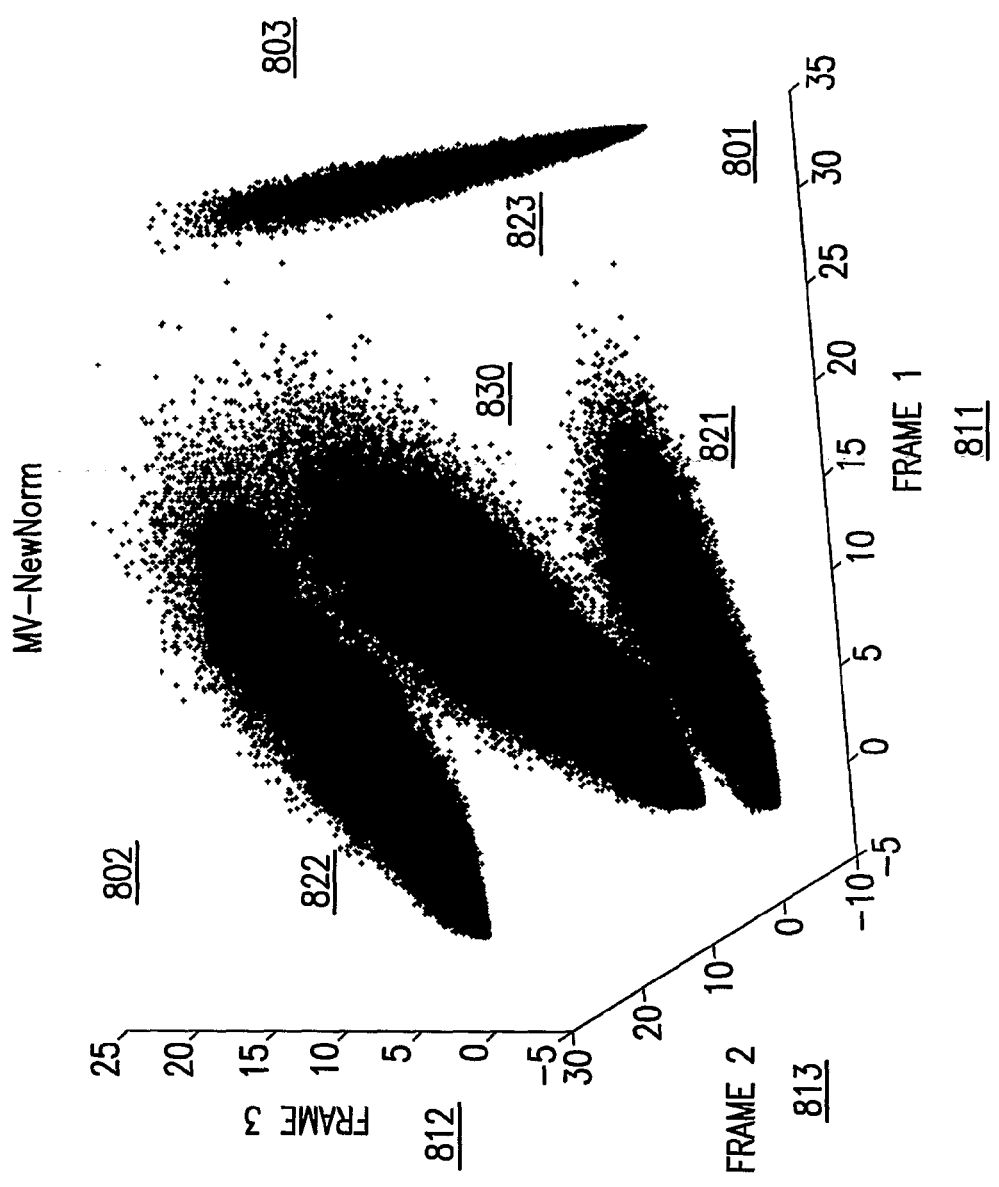
FIG. 8 is a graph illustrating dynamic PET data in the sinogram domain projected across three orthogonal planes where the sinogram data is masked and pixel-wise noise-normalized and where whole volume data from the different frames is used according to one embodiment of the present invention.
Figure 10A:
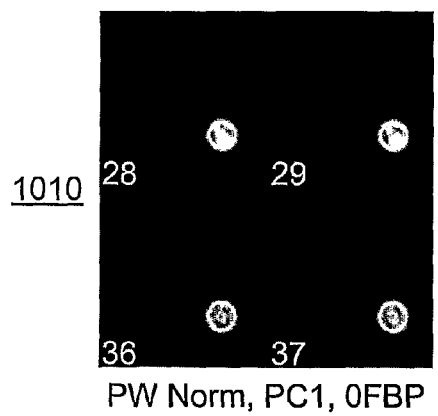
FIG. 10 is a comparative selection of principal components (PC images) obtained from applying the MVW-PCA approach to sinogram data and then reconstructing the dynamic PET images using FBP with applied 4 mm Hanning filter where one set of principal components were obtained applying pixel-wise (PW) noise pre-normalization according to one embodiment of the present invention and the other set of principal components were obtained applying the available Pedersen noise-normalization method for input data.
Figure 10B:
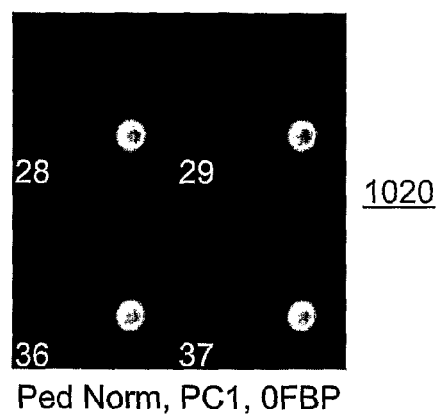
Figure 10C:
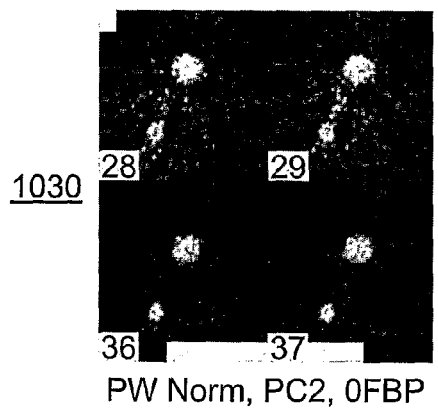
Figure 10D:
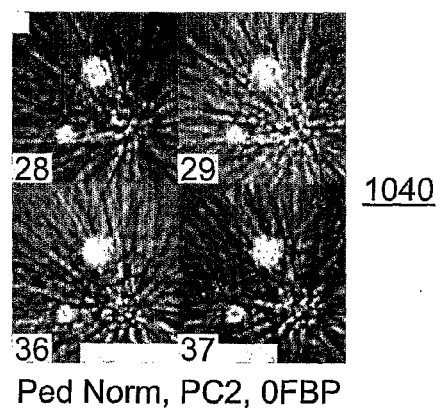
Figure 10E:
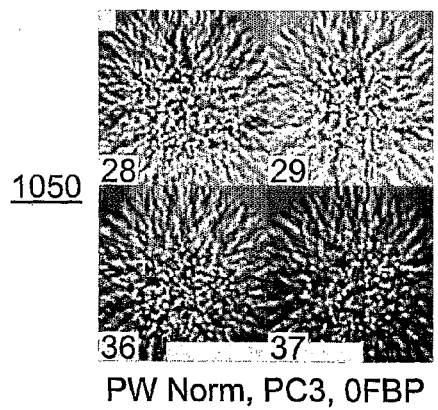
Figure 10F:
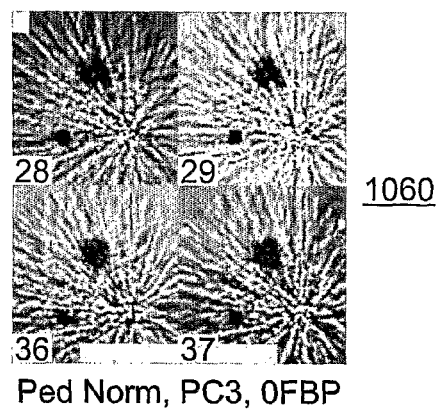

According to the above embodiments, the differences between the approaches to the application of PCA (not masked and not pre-normalized SW-PCA, masked and PW noise pre-normalized SW-PCA, and MVW-PCA) as indicated by the status of the input data provided for the PCA analysis is outlined in FIGS. 6-8 where each figure is positioned and rotated in the same manner to facilitate accurate comparison. FIG. 6 is a graph illustrating dynamic PET data in the sinogram domain projected across three orthogonal planes where the sinogram data is not masked and not pre-normalized according to one embodiment of the present invention. Each orthogonal plane 601-603 represents one particular frame 611-613 of a sinogram for which dynamic PET data is generated. The blue or lighter shaded 3D scatter plots 621-623 represent the projection on each of the planes 601-603 while the red or darker scatter plot 630 illustrates the 3D distribution across the frames 611-613. The non-pre-normalized PET sinogram data shows three clusters with a dominant cluster of pixel values around zero, which mostly represent background noise. The dominant portion of this cluster tends to force PCA to make a projection perpendicular to a line through the origin (the concentration of the clusters) which may impact the readability of the principal components.

FIG. 7 is a graph illustrating dynamic PET data in the sinogram domain projected across three orthogonal planes where the sinogram data is masked and pixel-wise noise pre-normalized according to one embodiment of the present invention. As in FIG. 6, each orthogonal plane 701-703 represents a particular frame 711-713 of a sinogram with a blue or lighter shaded 3D scatter plot 721-723 representing the projection of the respective frame data. The red or darker scatter plot 730 illustrates the 3D distribution across the frames 711-713. SW-PCA on PW noise pre-normalized PET input data (sinograms) and the masking of the background removing the background clutter (the clustering of the pixels) reflected in FIG. 7 result in a different clustering for the same data more accurately representing the spread of the radionuclides around the other components where, in particular, the concentration of pixel values around zero has been decreased.

FIG. 8 is a graph illustrating dynamic PET data in the sinogram domain projected across three orthogonal planes where the sinogram data is masked and pixel-wise noise pre-normalized and where whole volume (volume-wise) data from the different frames is used according to one embodiment of the present invention. Similar to FIGS. 6 and 7, each orthogonal plane 801-803 represents a particular frame 811-813 containing a projection of the frame data shown in the blue or lighter shaded 3D scatter plots 821-823 with a red or darker shaded scatter plot 830 illustrating the 3D distribution across the frames 811-813. In FIG. 8, masking the background is performed on the whole volume of the pre-normalized dynamic PET data. The masked data is PW noise pre-normalized after the masking occurs. The result is a more homogenous data distribution of the dynamic PET input data without the clustering of the pixels around the origin as found in FIGS. 6 and 7. This may allow the extraction of components from the input data (e.g., the sinograms) with effects from the background pixels factored out (elimination or reduction of the background noise) and thereby improving the application of PCA. As shown in FIG. 8, more pixels are utilized representing the whole volume rather than a sinogram and as a result they provide a smoother appearance. In addition, the scaling of the image may further reduce the appearance of the clusters.

FIG. 9 is a comparative selection of principal components (PC images) obtained from applying the MVW-PCA approach to sinogram data and then reconstructing the dynamic PET images using OSEM with applied 4 mm Hanning filter where one set of principal components were obtained applying pixel-wise (PW) noise pre-normalization according to one embodiment of the present invention and the other set of principal components were obtained applying the available Pedersen noise-normalization method for input data. PC1 910-920 and PC2 930-940 principal component images are shown for the results of MVW-PCA on sinogram data reconstructed using ordered subsets expectation maximization (OSEM) with a Hanning filter as stated. The left two images (panes) 910, 930 are the result of applying pixel-wise noise pre-normalization on the PET input data according to one embodiment of the present invention while the right two images (panes) 920, 940 are the result of applying the available Pedersen method of noise-normalization of the input data. The PW noise pre-normalization has better separation of the structures into the PC1 and PC2 images with reduced noise (a lower signal-to-noise ratio) especially in the second principal component PC2 930. The dynamic PET images using the Pedersen noise normalization method shows kinetic activity from first principal component causing noise in the second principal component. For example, in the Pederson PC2 940 kinetic behavior from the Pederson PC1 920 shows up as noise (the four circles to the right of the bright dots are the noisy outlines of the PC1 component circles still visible in the PC2) while the PW noise pre-normalized PC2 930 shows none of the corresponding PC1 910 noise.

FIG. 10 is a comparative selection of principal components (PC images) obtained from applying the MVW-PCA approach to sinogram data and then reconstructing the dynamic PET images using FBP with applied 4 mm Hanning filter where one set of principal components were obtained applying pixel-wise (PW) noise pre-normalization according to one embodiment of the present invention and the other set of principal components were obtained applying the available Pedersen noise-normalization method for input data. PC1 1010-1020, PC2 1030-1040, and PC3 1050-1060 principal component images are shown for the results of MVW-PCA on sinogram data reconstructed using filtered back project (FBP) with a Hanning filter as stated. The left three images (panes) 1010, 1030, 1050 are the result of applying pixel-wise noise pre-normalization on the PET input data according to one embodiment of the present invention while the right three images (panes) 1020, 1040, 1060 are the result of applying the available Pedersen method of noise-normalization of the input data. The PW noise pre-normalization has better separation of the structures with reduced noise (a lower signal-to-noise ratio) especially in the later principal components PC2 1030 and PC3 1050. The dynamic PET images using the Pedersen noise normalization method shows kinetic activity from one principal component causing noise in a subsequent component. For example, in the Pederson PC3 1060 kinetic behavior from the Pederson PC2 1040 shows up as noise (the dark outlines of the PC2 component circles are still visible in the PC3) while the PW noise pre-normalized PC3 1050 shows none of the corresponding PC2 1030 noise.

Figure 11:
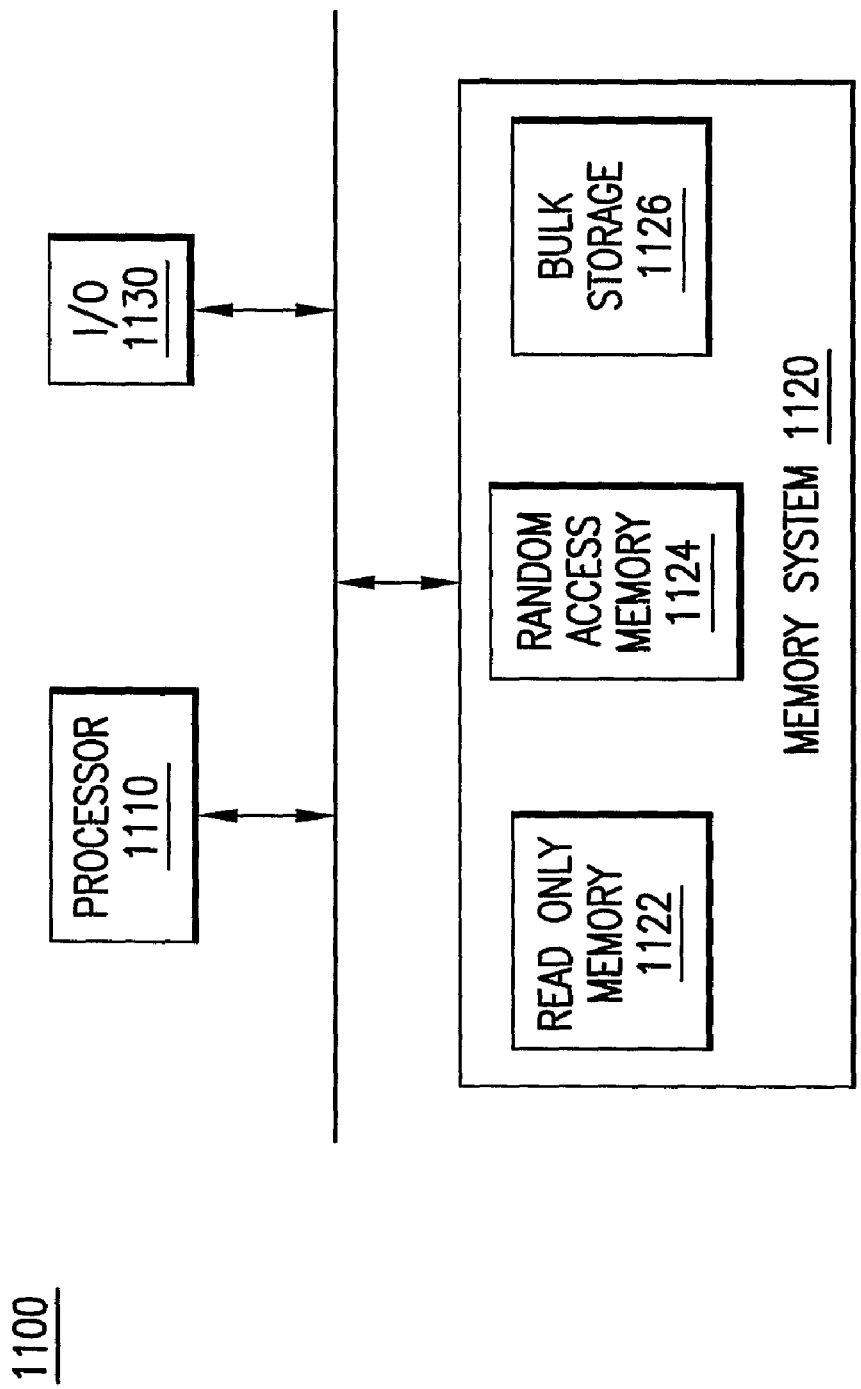
FIG. 11 is a block diagram illustrating the platform on which the MVW-PCA method for applying PCA to raw dynamic PET data using pre-normalization techniques may operate according to one embodiment of the present invention.

FIG. 11 is a block diagram illustrating the platform on which the MVW-PCA method for applying PCA to raw dynamic PET data using pre-normalization techniques may operate according to one embodiment of the present invention. Functionality of the foregoing embodiments may be provided on various computer platforms executing program instructions. One such platform 1100 is illustrated in the simplified block diagram of FIG. 11. There, the platform 1100 is shown as being populated by a processor 1110, a memory system 1120 and an input/output (I/O) unit 1130. The processor 1110 may be any of a plurality of conventional processing systems, including microprocessors, digital signal processors and field programmable logic arrays. In some applications, it may be advantageous to provide multiple processors (not shown) in the platform 1100. The processor(s) 1110 execute program instructions stored in the memory system. The memory system 1120 may include any combination of conventional memory circuits, including electrical, magnetic or optical memory systems. As shown in FIG. 11, the memory system may include read only memories 1122, random access memories 1124 and bulk storage 1126. The memory system not only stores the program instructions representing the various methods described herein but also can store the data items on which these methods operate. The I/O unit 1130 would permit communication with external devices (not shown).

Though generally described for the brain in the embodiments above, MVW-PCA may be applied to other anatomical and/or biological regions in alternative embodiments of the present invention.

What is claimed is:

1. A method for improving quality in a positron emission tomography image, comprising:
   normalizing each pixel in a sinogram of a positron emission tomography study, the pixel normalized by dividing each pixel value by the square-root of its absolute value;
   generating a PCA sinogram as a function of performing principal component analysis on the normalized sinogram; and
   reconstructing the positron emission tomography image as a function of a reconstruction method applied to the PCA sinogram.

2. The method according to claim 1, further comprising:
   scaling back the generated PCA sinogram as a function of a scaling method applied to the generated PCA sinogram.

3. The method according to claim 2, wherein the scaling method is an inverse PCA method.

4. The method according to claim 1, wherein the reconstruction method is at least one of a filtered back projection method and an ordered subsets expectation maximization method.

5. A method for creating a masked input data set to improve image quality in a positron emission tomography image, comprising:
   retrieving the sinograms from a positron emission tomography input data set, the input data set including multiple frames, each frame including one or more sinograms;
   generating a PCA-modified sinogram for each of the frames as a function of performing principal component analysis (PCA) on the sinograms;
   masking the PCA modified sinograms from the generating step as a function of setting a pixel value in the PCA sinogram to 0 for a background pixel and 1 for an object pixel;
   saving a coordinate for each of the object pixels; and
   storing each of the object pixels in a column vector of an input data matrix as a function of extracting the object pixel using the coordinates from the saving step, wherein the input data matrix represents the masked sinograms and serves as the masked positron emission tomography input data set.

6. The method according to claim 5, further comprising:
   normalizing the object pixels in the masked input matrix of the masked sinogram, the pixel normalized by applying an equation used on all other pixels of the masked sinogram;
   generating a masked PCA sinogram as a function of performing performing principal component analysis on the normalized sinogram;
   recreating an PCA-modified sinogram as function of extracting the normalized pixel from the masked PCA sinogram and setting at least one background pixel to a value 0; and
   reconstructing the positron emission tomography image as a function of a reconstruction method applied to the PCA-modified sinogram.

7. The method according to claim 6, further comprising:
   scaling back the recreated PCA-modified sinogram as a function of a scaling method applied to the recreated PCA-modified sinogram.

8. The method according to claim 7, wherein the scaling method is an inverse PCA method.

9. The method according to claim 6, wherein the reconstruction method is at least one of a filtered back projection method and an ordered subsets expectation maximization method.

10. A method for improving quality in a positron emission tomography image, comprising:
    normalizing a pixel in a masked input sinogram, the pixel normalized by applying an equation used on all other pixels of the masked input sinogram;

calculating a normalized sinogram from the masked sinogram as a function of normalizing each pixel in the masked input sinogram;

generating a masked PCA sinogram as a function of performing performing principal component analysis on the normalized sinogram;

recreating a PCA sinogram as function of extracting the normalized pixel from the masked PCA sinogram and setting at least one background pixel to a value 0; and reconstructing the positron emission tomography image as a function of a reconstruction method applied to the PCA sinogram.

11. The method according to claim 10, further comprising:

scaling back the recreated PCA sinogram as a function of a scaling method applied to the recreated PCA sinogram.

12. The method according to claim 11, wherein the scaling method is an inverse PCA method.

13. The method according to claim 10, wherein the reconstruction method is at least one of a filtered back projection method and an ordered subsets expectation maximization method.

14. A system for improving quality in a positron emission tomography image, comprising:
a memory system;
an input/output unit; and
a processor, wherein the processor is adapted to:
(i) normalize each pixel in a sinogram of a positron emission tomography study, the pixel normalized by dividing each pixel value by the square-root of its absolute value
(ii) generate a PCA sinogram as a function of performing performing principal component analysis on the normalized sinogram; and
(iii) reconstruct the positron emission tomography image as a function of a reconstruction method applied to the PCA sinogram.

15. A system according to claim 14 for further creating a masked input data set to improve image quality in a positron emission tomography image, comprising:
a memory system;
an input/output unit; and
a processor, wherein the processor is adapted to:
(i) retrieve the sinograms from a positron emission tomography input data set, the input data set including multiple frames, each frame including one or more sinograms;
(ii) generate a PCA-modified sinogram for each of the frames as a function of performing principal component analysis (PCA) on the sinograms;
(iii) mask the PCA modified sinograms from the generating step as a function of setting a pixel value in the PCA sinogram to 0 for a background pixel and 1 for an object pixel;
(iv) save a coordinate for each of the object pixels; and
(v) store each of the object pixels in a column vector of an input data matrix as a function of extracting the object pixel using the coordinates from the saving step, wherein the input data matrix represents the masked sinograms and serves as the masked positron emission tomography input data set.

16. A system for improving quality according to claim 14, wherein the processor is further adapted to
(i) calculate a normalized sinogram from the masked sinogram as a function of normalizing each pixel in the masked input sinogram;
(ii) generate a masked PCA sinogram as a function of performing performing principal component analysis on the normalized sinogram; and
(iii) recreate PCA sinogram as function of extracting the normalized pixel from the masked PCA sinogram and setting at least one background pixel to a value 0.

17. A non-transitory computer readable medium including instructions adapted to execute a method for improving quality in a positron emission tomography image, the method comprising:
normalizing each pixel in a sinogram of a positron emission tomography study, the pixel normalized by dividing each pixel value by the square-root of its absolute value;
generating a PCA sinogram as a function of performing performing principal component analysis on the normalized sinogram; and
reconstructing the positron emission tomography image as a function of a reconstruction method applied to the PCA sinogram.

18. A non-transitory computer readable medium according to claim 17 further including instructions adapted to execute a method for creating a masked input data set to improve image quality in a positron emission tomography image, the method comprising:
retrieving the sinograms from a positron emission tomography input data set, the input data set including multiple frames, each frame including one or more sinograms;
generating a PCA-modified sinogram for each of the frames as a function of performing principal component analysis (PCA) on the sinograms;
masking the PCA modified sinograms from the generating step as a function of setting a pixel value in the PCA sinogram to 0 for a background pixel and 1 for an object pixel;
saving a coordinate for each of the object pixels; and
storing each of the object pixels in a column vector of an input data matrix as a function of extracting the object pixel using the coordinates from the saving step, wherein the input data matrix represents the masked sinograms and serves as the masked positron emission tomography input data set.

19. A non-transitory computer readable medium according to claim 17, wherein the method further comprising the step of:
recreating a PCA sinogram as function of extracting the normalized pixel from the masked PCA sinogram and setting at least one background pixel to a value 0.

* * * * *